(12) United States Patent
Devpuje et al.

(10) Patent No.: US 12,537,663 B2
(45) Date of Patent: Jan. 27, 2026

(54) PROGRAMMABLE DELAY-LOCKED LOOP (DLL) THAT UTILIZES A LOW POWER PHASE DETECTOR

(71) Applicant: QUALCOMM INCORPORATED, San Diego, CA (US)

(72) Inventors: Gajanan Maroti Devpuje, Karnataka (IN); Mohamed Jabir, Alappuzha (IN); Ayush Mittal, Karnataka (IN); Anurag Tiwari, Karnataka (IN); Krishnaswamy Thiagarajan, Karnataka (IN); Bhushan Shanti Asuri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/609,068

(22) Filed: Mar. 19, 2024

(65) Prior Publication Data

US 2025/0300803 A1    Sep. 25, 2025

(51) Int. Cl.
    *H04L 7/033*    (2006.01)
    *H04L 7/00*    (2006.01)
    *H04L 27/152*    (2006.01)

(52) U.S. Cl.
    CPC .......... *H04L 7/0331* (2013.01); *H04L 7/0037* (2013.01); *H04L 27/1525* (2013.01)

(58) Field of Classification Search
    CPC .. H04L 7/0331; H04L 7/0037; H04L 27/1525
    See application file for complete search history.

(56) References Cited

U.S. PATENT DOCUMENTS

| | | | | |
|---|---|---|---|---|
| 6,313,680 | B1 * | 11/2001 | Havens | H03H 11/22 |
| | | | | 327/236 |
| 6,448,755 | B1 * | 9/2002 | Opsahl | H03L 7/093 |
| | | | | 324/621 |
| 10,447,280 | B2 | 10/2019 | Mittal et al. | |
| 2009/0278581 | A1 * | 11/2009 | Yang | H03L 7/0816 |
| | | | | 327/158 |
| 2021/0391853 | A1 * | 12/2021 | Jann | H03B 5/12 |
| 2022/0085796 | A1 * | 3/2022 | Urakawa | H03K 5/00006 |

* cited by examiner

*Primary Examiner* — Jean B Corrielus
(74) *Attorney, Agent, or Firm* — Smith Tempel Blaha LLC/Qualcomm Incorporated

(57) ABSTRACT

A delay-locked loop (DLL) is provided that ensures that the phase outputs that are provided as inputs to the harmonic rejection mixer (HRM) are sufficiently accurate to allow the HRM to effectively cancel out the spurious harmonic frequencies, thereby improving HRM parameters. The phase detector of the DLL can be programmable to provide a "knob" that can be used post layout to adjust the output phase differences of the DLL to make them more precise. This feature overcomes issues with mismatches in silicon that in the past have affected the ability of the DLL to settle precisely to the desired phases. This, in turn, loosens design and manufacturing constraints that are currently employed to ensure that the DLLs settle precisely to the desired phases. Additionally, logic gates are eliminated from the phase detector and replaced with resistors to reduce current consumption and further looser design and manufacturing constraints.

20 Claims, 11 Drawing Sheets

PROGRAMMABLE DELAY-LOCKED LOOP (DLL) THAT UTILIZES A LOW POWER PHASE DETECTOR

FIELD

The present disclosure relates generally to electronics, and more particularly, to a delay-locked loop (DLL).

BACKGROUND

Electronic devices include traditional computing devices such as desktop computers, notebook computers, smart phones, wearable devices like a smart watch, servers, and the like. However, electronic devices also include other types of computing devices such as personal voice assistants, thermostats, automotive electronics, robotics, devices embedded in other machines like refrigerators and industrial tools, Internet-of-Things (IoTs) devices, and so forth. These various electronic devices provide information, entertainment, social interaction, security, safety, productivity, transportation, and other services to human users. Thus, electronic devices play crucial roles in many aspects of modern society.

Many of the services provided by electronic devices in today's interconnected world depend at least partly on electronic communications. Electronic communications can include those between and among widely distributed electronic devices using wireless or wired signals over one or more networks, such as the Internet or a cellular network. Electronic communications can also include those between different printed circuit boards, modules, chips, or cores of an integrated circuit within a single electronic device. Regardless, electronic communications are usually accomplished by generating or propagating signals. Typically, such electronic communications are performed more quickly or more reliably by controlling the relative timing of a signal in relation to one or more other signals.

A timing of a signal in relation to another signal is referred to as a phase difference between the two signals, or relative phases between the two signals. To use a signal for electronic communications, the phase of the signal is adjusted in many circumstances. The phase of a signal can be adjusted by, for example, delaying the signal. A DLL is a digital circuit that can delay a signal to introduce a phase shift or phase delay into the signal to produce a delayed signal. The delayed signal can be used to facilitate a timing alignment with another signal, to generate a radio frequency (RF) transmission signal, and so forth.

In an example usage scenario, a delay-locked loop can be used to shift a phase of a signal, such as a clock signal. The phase-shifted clock signal can enhance a clock rise timing with respect to a valid output timing of a data signal having data that is to be obtained via a sampling of the data signal. The DLL shifts the clock signal for the data sampling such that a rising edge of the clock signal is likely to occur near the middle of a time period during which a data value of the data signal is expected to be valid. This increases the likelihood of successfully acquiring the valid data.

In another example usage scenario, a DLL can shift a phase of a clock signal by some number of degrees, such as 45 degrees, to facilitate transmission of signals at radio frequencies. A harmonic rejection mixer (HRM) is employed in some RF transceivers, such as at an RF transmitter thereof, to reduce the occurrence of spurious harmonic frequencies that can lower a quality of a transmission signal. An HRM typically uses at least four different phases of a clock signal (e.g., 0°, 45°, 90°, and 135° shifted versions of the clock signal) to filter out, or at least reduce, the undesired harmonic frequencies. A DLL can be used to generate any of the four different phases of the clock signal for an HRM.

In some cases, the phase outputs of the DLL that are input to the HRM are insufficiently accurate to allow the HRM to effectively cancel out the spurious harmonic frequencies. This can degrade certain parameters of the HRM such as the 3LOmBB, 4FMODP and 4FMODS parameters, which can degrade RF transceiver performance. A number of issues can affect the ability of the DLL to settle precisely to the desired phases, such as rise and fall slew rate differences. This can be caused by post-layout mismatches in silicon of the RF transceiver integrated circuit (IC) that cause the desired phases to drift apart. In silicon, there is currently no "knob" that can be used post layout to adjust the output phase differences to make them more precise to improve the HRM parameters. As a result, extremely tight design and manufacturing constraints are employed to ensure that the DLLs settle precisely to the desired phases, but with only limited success.

DLLs are also required to have a particular duty cycle while also operating over a particular angular range, as they typically need to operate over multiple frequencies. In some cases, the DLL is capable of achieving a particular duty cycle (e.g., 25%) while operating over a relatively wide angular range (e.g., −135° to 225°), but to achieve a lower duty cycle (e.g., 12.5%) the angular operating range is limited (e.g., 45° to 135°).

SUMMARY

Various implementations of apparatuses, systems, methods and devices within the scope of the appended claims each have several aspects, no single one of which is solely responsible for the desirable attributes described herein. Without limiting the scope of the appended claims, some prominent features are described herein.

An apparatus according to one exemplary embodiment comprises a phase detector (PD) comprises an input stage and first and second sets of resistors electrically coupled to the input stage. The input stage is configured to receive a plurality of quadrature phases and a plurality of 45° phases having a second duty cycle from a duty cycle converter (DTC) of the DLL that converts quadrature and 45° phases having a first duty cycle into the quadrature and 45° phases having the second duty cycle. The first and second sets of resistors that are electrically coupled to the input stage receive the quadrature and 45° phases having the second duty cycle, respectively. The resistors of the first set of resistors sum the quadrature phases received in the input stage together to generate a first PD output voltage signal and the resistors of the second set of resistors sum the 45° phases received at the input stage together to generate a second PD output voltage signal. The first and second PD output voltage signals are output from first and second output terminals of the PD, respectively.

A radio frequency (RF) transceiver according to an exemplary embodiment comprises a DLL comprising a plurality of differential delay lines, a duty cycle converter (DTC), and a phase detector (PD). Each differential delay line is configured to input a first clock signal and to output a quadrature phase and a 45° phase. The quadrature and 45° phases have a first duty cycle. The differential delay lines comprise control circuits configured to control delays of delay elements of the differential delay lines. The DTC is configured to input the quadrature and 45° phases having the first duty cycle and to output quadrature and 45° phases having a second duty cycle. The PD comprises an input stage configured to receive the quadrature and 45° phases having the second duty cycle that are output from the DTC and at least first and second sets of resistors electrically coupled to the input stage for receiving the quadrature phases and the 45° phases having the second duty cycle, respectively, from the input stage. The first set of resistors sum the quadrature phases received in the input stage together to generate a first PD output voltage signal and wherein the resistors of the second set of resistors sum the 45° phases received at the input stage together to generate a second PD output voltage signal, the first and second PD output voltage signals being output from first and second output terminals of the PD, respectively.

A method for performing phase detection, according to an exemplary embodiment, comprises providing a PD comprising an input stage and at least first and second sets of resistors electrically coupled to the input stage. The method may further comprise, in the input stage, receiving a plurality of quadrature phases and a plurality of 45° phases having a second duty cycle from a DTC that converts quadrature and 45° phases having a first duty cycle into the quadrature and 45° phases having the second duty cycle. The method may further comprise, with the resistors of the first set of resistors, summing the quadrature phases received in the input stage together to generate a first PD output voltage signal. The method may further comprise, with the resistors of the second set of resistors, summing the 45° phases received at the input stage together to generate a second PD output voltage signal and outputting the first and second PD output voltage signals from first and second output terminals of the PD, respectively.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

DETAILED DESCRIPTION

Figure 1:
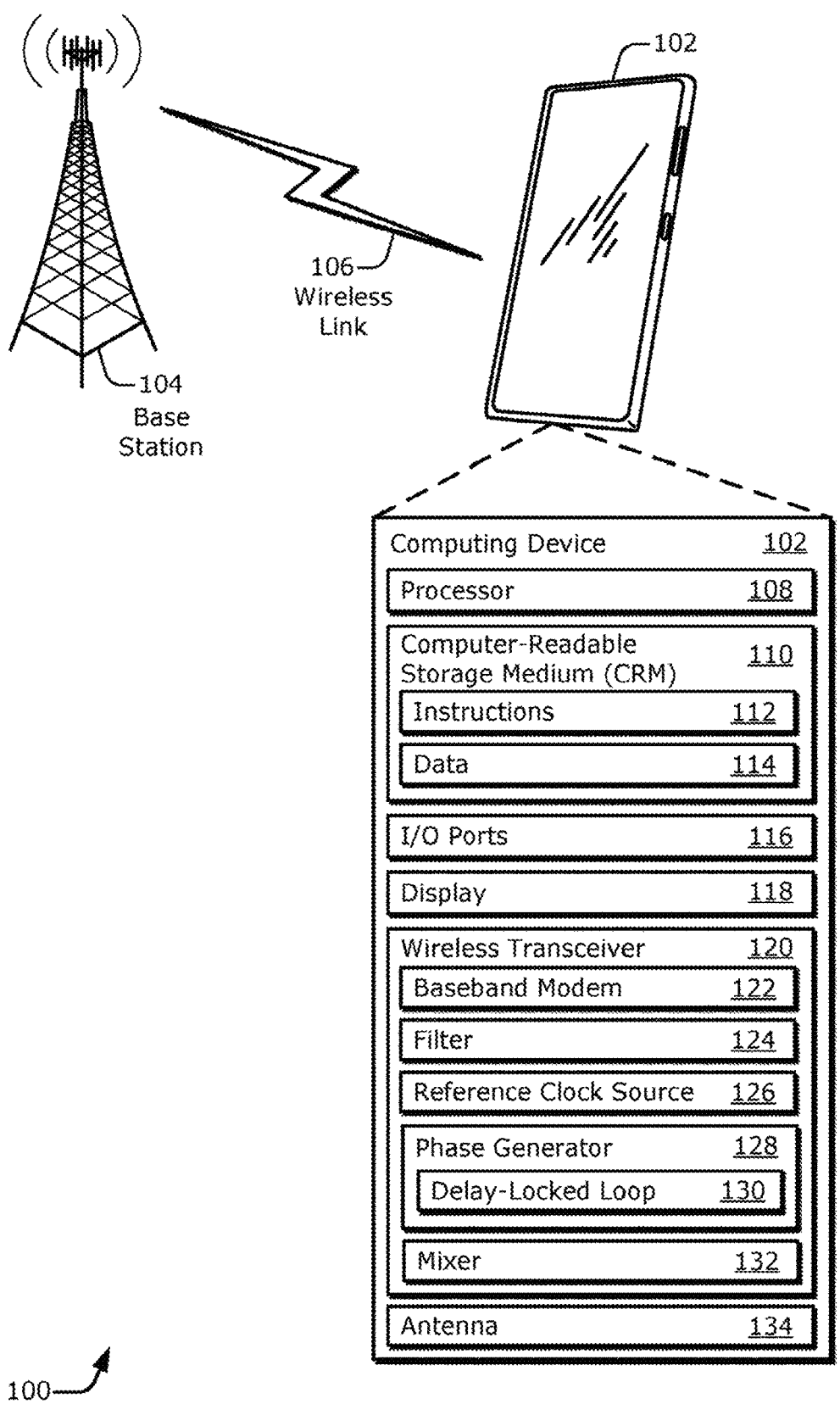
FIG. 1 illustrates an example environment that includes a wireless transceiver in which the DLL of the present disclosure can be implemented.

The present disclosure provides a DLL that ensures that the phase outputs that are provided as inputs to the HRM are sufficiently accurate to allow the HRM to effectively cancel out the spurious harmonic frequencies, thereby improving HRM parameters (e.g., the 3LOmBB, 4FMODP and 4FMODS parameters), and consequently, improving RF transceiver performance. In accordance with an exemplary embodiment, the phase detector (PD) of the DLL is programmable to provide a "knob" that can be used post layout to adjust the output phase differences of the DLL to make them more precise. This feature overcomes issues with post-layout mismatches in silicon that in the past have affected the ability of the DLL to settle precisely to the desired phases. This, in turn, loosens design and manufacturing constraints that are currently employed to ensure that the DLLs settle precisely to the desired phases.

In accordance with an exemplary embodiment, the PD uses no logic gates, which reduces power consumption while also further loosening design and manufacturing constraints. In many current DLL designs, a duty cycle converter (DTC) receives the output phases of the delay lines, converts their duty cycle into a new duty cycle (e.g., from 50% to 25% or from 50% to 12.5%) and outputs the phase outputs with the new duty cycle to the PD. The DTC and the PD typically have logic gates at their output and input stages, respectively, that are precisely designed and manufactured to provide highly accurate slew rate control. Very tight design and manufacturing constraints are typically needed to ensure proper slew rate control between the gates of these stages. By removing logic gates from the PD, design and manufacturing constraints for the DLL are further loosened.

Also, when there are logic gates in the input stage of the PD, the gates in the output stage of the DTC must drive the gates of the PD, which results in more current consumption. Thus, removing logic gates from the input stage of the PD reduces power consumption while also loosening design and manufacturing constraints. In accordance with an exemplary embodiment, logic gates in the PD are replaced with first and second sets of resistors that sum the quadrature and 45° phases, respectively, to produce first and second PD output voltage signals, respectively.

Yet another feature of the DLL of the present disclosure is that it is able to accomplish all of the above while also achieving a 12.5% duty cycle over a wide angular operating range, e.g., −135° to 225°. These and other features and advantages are described below with reference to the figures.

The terminology used herein is for purposes of describing particular embodiments only and is not intended to be limiting.

The word "exemplary" is used herein to mean "serving as an example, instance, or illustration." Any aspect described herein as "exemplary" is not necessarily to be construed as preferred or advantageous over other aspects.

As used in the specification and appended claims, the terms "a," "an," and "the" include both singular and plural referents, unless the context clearly dictates otherwise. Thus, for example, "a device" includes one device and plural devices.

Relative terms may be used to describe the various elements' relationships to one another, as illustrated in the accompanying drawings. These relative terms are intended to encompass different orientations of the device and/or elements in addition to the orientation depicted in the drawings.

It will be understood that when an element is referred to as being "connected to" another element, it can be directly connected to the other element or intervening elements may be present.

FIG. 1 illustrates an example environment 100 that includes a wireless transceiver 120 in which the DLL of the present disclosure can be implemented. The example environment 100 includes a computing device 102 that communicates with a base station 104 through a wireless communication link 106. In this example, the computing device 102 is implemented as a smart phone. However, the computing device 102 may be implemented as any suitable computing or electronic device, such as a modem, cellular base station, broadband router, access point, cellular phone, gaming device, navigation device, media device, laptop computer, desktop computer, tablet computer, server, network-attached storage (NAS) device, smart appliance, vehicle-based communication system, Internet-of-Things (IoTs) device, and so forth.

The base station 104 communicates with the computing device 102 via the wireless link 106, which may be implanted using any suitable type of wireless link. Although depicted as a base station tower of a cellular radio network, the base station 104 may represent or be implemented as another device, such as a satellite, cable television head-end, terrestrial television broadcast tower, access point, peer-to-peer device, mesh network node, fiber optic line, and so forth. Hence, the computing device 102 may communicate with the base station 104 or another device via a wired connection, a wireless connection, or a combination thereof.

The wireless link 106 can include a downlink of data or control information communicated from the base station 104 to the computing device 102 and an uplink of other data or control information communicated from the computing device 102 to the base station 104. The wireless link 106 may be implemented using any suitable communication protocol or standard, such as 3rd Generation Partnership Project Long-Term Evolution (3GPP LTE), IEEE 802.11, IEEE 802.16, Bluetooth™, and so forth.

The computing device 102 includes a processor 108 and a computer-readable storage medium (CRM) 110. The processor 108 may include any type of processor, such as an application processor or multi-core processor, that is configured to execute processor-executable code stored by the CRM 110. The CRM 110 may include any suitable type of data storage media, such as volatile memory (e.g., random access memory (RAM)), double data rate dynamic RAM (DDR DRAM), non-volatile memory (e.g., read only memory (ROM), Flash memory, etc.), optical media, magnetic media (e.g., disk or tape), and so forth. In the context of this disclosure, the CRM 110 is implemented to store instructions 112, data 114, and other information of the computing device 102, and thus does not include transitory propagating signals or carrier waves.

The computing device 102 may also include input/output (I/O) ports 116 or a display 118. The I/O ports 116 enable data exchanges or interaction with other devices, networks, or users. The I/O ports 116 may include serial ports (e.g., universal serial bus (USB) ports), parallel ports, audio ports, infrared (IR) ports, and so forth. The display 118 presents graphics of the computing device 102, such as a user interface associated with an operating system, program, or application. Alternatively or additionally, the display 118 may be implemented as a display port or virtual interface through which graphical content of the computing device 102 is communicated or presented.

For communication purposes, the computing device 102 also includes a wireless transceiver 120 and an antenna 134. The wireless transceiver 120 provides connectivity to respective networks and other electronic devices connected therewith. Alternatively or additionally, the computing device 102 may include a wired transceiver, such as an Ethernet or fiber optic interface for communicating over a personal or local network, an intranet, or the Internet. The wireless transceiver 120 may facilitate communication over any suitable type of wireless network, such as a wireless local area network (LAN) (WLAN), a peer-to-peer (P2P) network, a mesh network, a cellular network, a wireless wide-area-network (WWAN), and/or a wireless personal-area-network (WPAN). In the context of the example environment 100, the wireless transceiver 120 enables the computing device 102 to communicate with the base station 104 and networks connected therewith.

The wireless transceiver 120 includes circuitry and logic for transmitting or receiving a communication signal for at least one communication frequency band. In operation, the wireless transceiver 120 can implement at least one, e.g., radio frequency (RF) transceiver to process data and/or signals associated with communicating data of the computing device 102 via the antenna 134. The wireless transceiver 120 includes at least one baseband modem 122. The baseband modem 122 may be implemented as a system on-chip (SoC) that provides a digital communication interface for data, voice, messaging, and other applications of the computing device 102. The baseband modem 122 may also include baseband circuitry to perform high-rate sampling processes that can include analog-to-digital conversion (ADC), digital-to-analog conversion (DAC), gain correction, skew correction, frequency translation, and so forth.

Generally, the wireless transceiver 120 can include bandpass filters, switches, amplifiers, and so forth for routing and conditioning signals that are transmitted or received via the antenna 134. As shown, the wireless transceiver 120 also includes at least one filter 124, at least one reference clock source 126, at least one phase generator 128, and at least one mixer 132. Here, the phase generator 128 includes at least one DLL 130. Thus, the wireless transceiver 120 can provide some attenuation for wireless signals at different frequencies using the filter 124. The wireless transceiver 120 can further perform frequency conversion using the mixer 132, which may include an upconverter and/or a downconverter that performs frequency conversion in a single conversion step, or through multiple conversion steps. The wireless transceiver 120 may also include logic to perform in-phase/ quadrature (I/Q) operations, such as synthesis, encoding, modulation, decoding, demodulation, and so forth.

In some cases, components of the wireless transceiver 120 are implemented as separate receiver and transmitter entities. Additionally or alternatively, the wireless transceiver 120 can be realized using multiple or different sections to implement respective receiving and transmitting operations (e.g., using separate transmit and receive chains). Operations of, as well as interactions between, the filter 124, the reference clock source 126, the phase generator 128 including the DLL 130, and the mixer 132 are described with reference to FIG. 2. The DLL 130 can at least partially implement a delay-locked loop 5 with differential delay lines.

Figure 2:
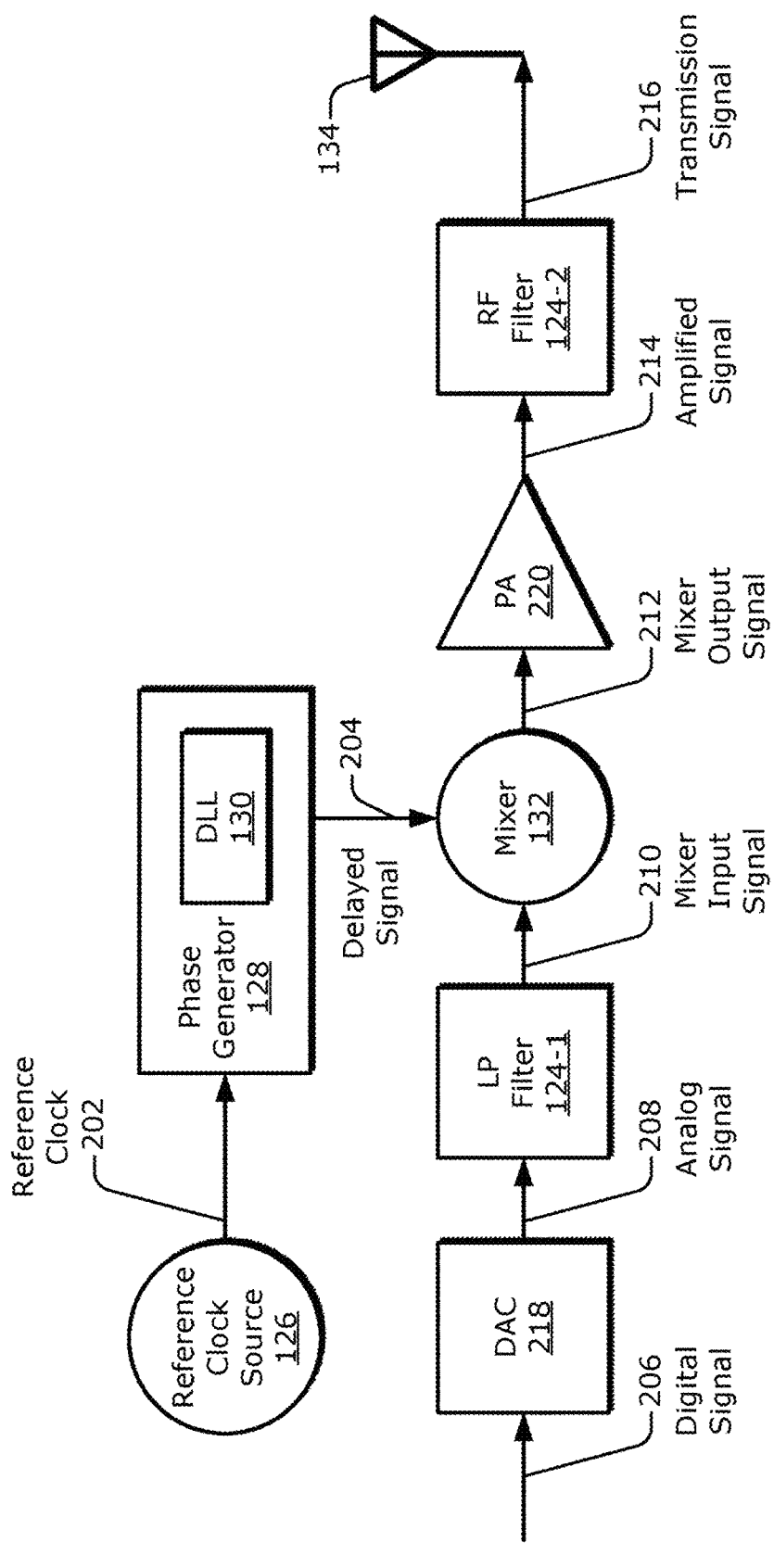
FIG. 2 illustrates an example of the wireless transceiver shown in FIG. 1 that includes the phase generator shown in FIG. 1 in which the DLL shown in FIG. 1 can be implemented to operate in conjunction with the mixer shown in FIG. 1.

FIG. 2 illustrates an example of the wireless transceiver 120 that includes the phase generator 128 in which the DLL 130 can be implemented to operate in conjunction with the mixer 132. The example components of the wireless transceiver 120 are depicted in two rows: an upper row and a lower row. The upper row includes the reference clock source 126 and the phase generator 128. From left-to-right, the lower row includes a digital-to-analog converter (DAC) 218, a low-pass filter 124-1, the mixer 132, a power amplifier (PA) 220, an RF filter 124-2, and the antenna 134.

In example implementations, for the upper row, the reference clock source 126 produces a reference clock 202. The reference clock 202 can oscillate at one or more frequencies to provide an oscillating clock signal or an oscillation signal. The reference clock source 126 can include an oscillator that generates a reference clock 202, can strengthen or condition a reference clock 202 received from another component, can change a frequency of a received reference clock 202, can selectively gate or release an incoming reference clock 202, some combination thereof, and so forth. The reference clock source 126 is coupled to the phase generator 128 and provides the reference clock 202 to the phase generator 128. Thus, the phase generator 128 is coupled to the reference clock source 126 to receive the reference clock 202. The phase generator 128 generates one or more signals having different phases based on the reference clock 202. To do so, the DLL 130 delays the reference clock 202 to produce at least one delayed signal 204. An example of the manner in which the DLL 130 delays signals to produce desired phase offsets is described below with reference to FIG. 3. Thus, at least one phase-shifted signal is provided from the phase generator 128 to the mixer 132 as the delayed signal 204.

In some implementations, the mixer 132 is realized as an HRM. In accordance with exemplary embodiments of the present disclosure, the HRM 132 is a high-linearity HRM that uses as its input eight clock phase offset signals, namely, I=0°, I45=45° lagging I, Q=90° lagging I, Q45=135° lagging I, Ib=180° lagging I, Ib45=225° lagging I, Qb=270° lagging I and Qb45=315° lagging I. The phase generator 128 can provide these clock phase offset signals to the HRM 132 for use in mixing a lower-frequency input signal that is to be upconverted for subsequent transmission. By using these eight clock phase offset signals, the HRM 132 is able to cancel spurious harmonics (e.g., the $3^{rd}$ and $5^{th}$ harmonics) to improve HRM parameters (e.g., the 3LOmBB, 4FMODP and 4FMODS parameters).

In the lower row, the digital-to-analog converter (DAC) 218 receives a digital signal 206, such as from the baseband modem 122 of FIG. 1. The DAC 218 performs a digital-to-analog conversion and produces an analog signal 208. The digital-to-analog converter 218 is coupled to the low-pass filter 124-1 and provides the analog signal 208 to the low-pass filter 124-1. The low-pass filter 124-1 performs a low-pass filtering operation by attenuating higher frequencies to produce a mixer input signal 210. The low-pass filter 124-1 is coupled to the HRM 132 and provides the mixer input signal 210 to the HRM 132.

The HRM 132 receives the mixer input signal 210 from the low-pass filter 124-1 and performs an upconverting operation to facilitate an RF transmission from the wireless transceiver 120. To do so, the HRM 132 mixes the mixer input signal 210 with at least one higher-frequency signal, such as the delayed signal(s) 204. As part of this mixing up-conversion operation, the HRM 132 rejects certain harmonics of the mixer input signal 210 using the delayed signal(s) 204. As a result of the up-conversion operation, the HRM 132 produces a mixer output signal 212. The HRM 132 is coupled to the power amplifier 220 and provides the mixer output signal 212 to the power amplifier 220.

The power amplifier 220 amplifies the mixer output signal 212 to produce an amplified signal 214. The power amplifier 220 is coupled to the RF filter 124-2 and provides the amplified signal 214 to the RF filter 124-2. The RF filter 124-2 filters the amplified signal 214 to accommodate the intended communication frequency band to produce a transmission signal 216. The RF filter 124-2 is coupled to the antenna 134 and provides the transmission signal 216 to the antenna 134. The antenna 134 can then emanate the transmission signal 216 from the wireless transceiver 120 as the wireless link 106 of FIG. 1. Although the DLL 130 is shown in the context of a transmit chain in the wireless transceiver 120, a delay-locked loop 130 with differential delay lines as described herein can be used in a receive chain of a wireless transceiver 120, as well as in alternative environments and scenarios.

Figure 3:
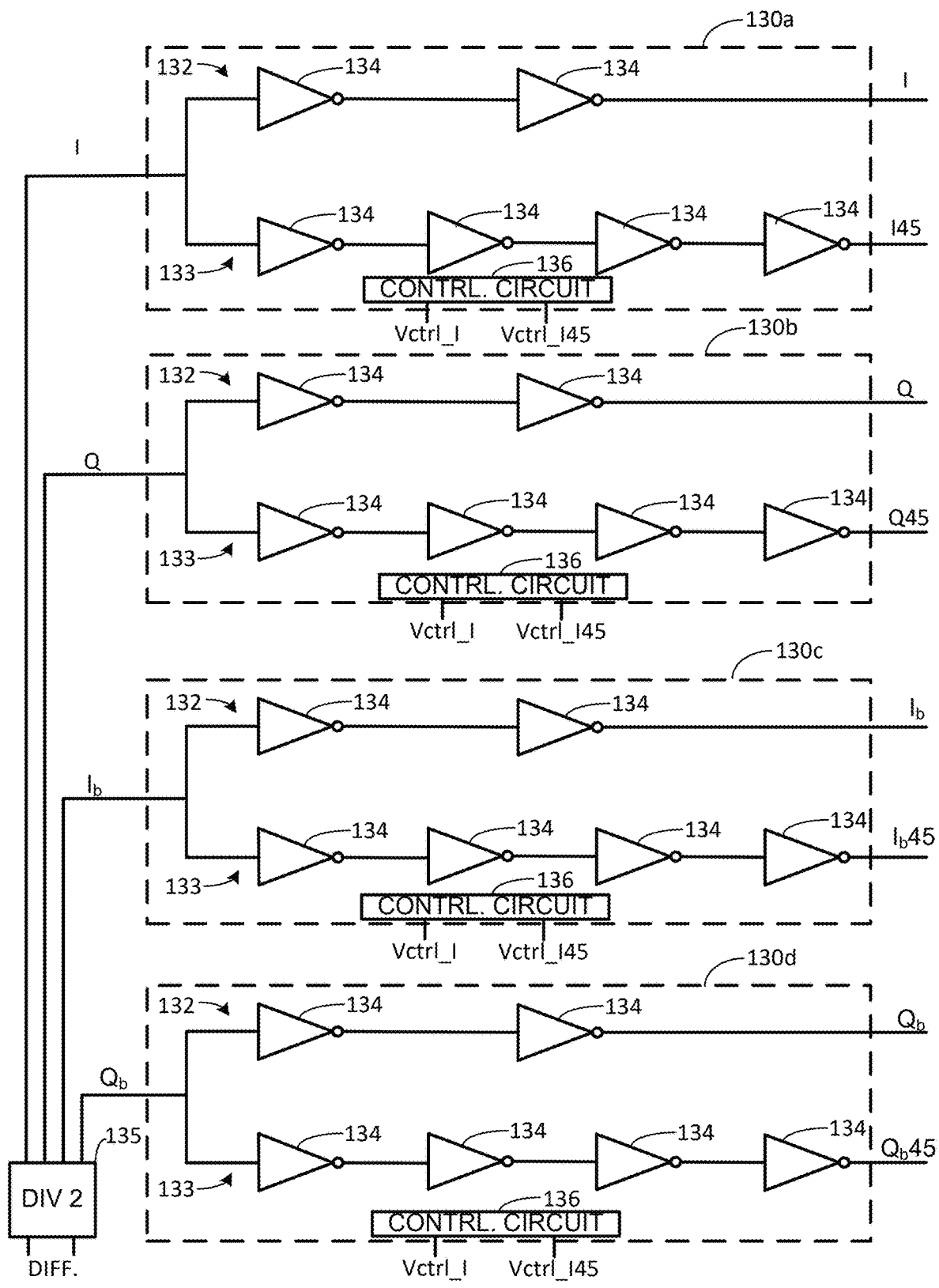
FIG. 3 is a block diagram of four sets of delay lines of the DLL shown in FIG. 1 in accordance with an exemplary embodiment.

FIG. 3 is a block diagram of four sets of delay lines 130a-130d of the DLL 130. Each set 130a-130d comprises a differential delay line. Each differential delay line comprises a first delay line 132 and a second delay line 133. Each of the delay lines 132 and 133 comprises delay elements 134 that are controllable by control signals Vctrl_I and Vctrl_I45 to control and adjust the amount by which the delay elements 134 of the delay lines 132 and 133 delay a clock phase received from divide-by-2 (DIV 2) clock signal divider logic 135. The manner in which the control signals Vctrl_I and Vctrl_I45 are generated is described below with reference to FIG. 4.

The first and second delay lines 132 and 133, respectively, of the first set of delay lines 130a receive the quadrature (I) clock phase that is output from the DIV 2 logic 135. The DIV 2 logic 135 divides a differential clock signal 136 received from a voltage controlled oscillator (VCO, not shown) by two and outputs the quadrature phases I, Q, Ib and Qb having a particular duty cycle (e.g., 50%). As indicated above, I=0° (it is phase-aligned with the clock signal received in the DIV 2 logic 135 from the VCO), Q=90° lagging I, Ib=180° lagging I, and Qb=270° lagging I.

The differential delay lines 130a-130d delay the received clock phases by predetermined amounts and output quadrature phases I, Q, Ib and Qb and the 45° phases I45, Q45, Ib45 and Qb45, as shown in FIG. 3. The quadrature and 45° phases that are output from the differential delay lines 130a-130d are: I is the 0° phase (i.e., it is phase-aligned with the clock signal received in the DIV 2 logic 135 from the VCO); I45 lags I by 45°; Q lags I by 90°; Q45 lags I by 135°; Ib lags I by 180°; Ib45 lags I by 225°; Qb lags I by 270°; and Qb45 lags I by 315°.

The first and second delay lines 132 and 133, respectively, of the first differential delay line 130a outputs the I=0° and I45 clock phases, respectively. The delay elements 134 of the delay lines 132 and 133 are controlled by Vctrl_I and Vctrl_I45, respectively, to ensure that the I and I45 clock phases output from the delay lines 132 and 133, respectively, are at a 45° phase difference from one another once the DLL 130 settles.

The first and second delay lines 132 and 133, respectively, of the second differential delay line 130b output the Q and Q45 clock phases, respectively. The delay elements 134 of the delay lines 132 and 133 of the second set 130b are controlled by Vctrl_I and Vctrl_I45, respectively, to ensure that the Q and Q45 clock phases output from the delay lines 132 and 133, respectively, are at a 45° phase difference from one another once the DLL 130 settles. As indicated above, Q and Q45 lag I by 90° and 135°, respectively.

The first and second delay lines 132 and 133, respectively, of the third differential delay line 130c output the Ib and Ib45 clock phases, respectively. The delay elements 134 of the delay lines 132 and 133 of the third set 130c are controlled by Vctrl_I and Vctrl_I45, respectively, to ensure that the Ib and Ib45 clock phases output from the delay lines 132 and 133, respectively, are at a 45° phase difference from one another once the DLL 130 settles. As indicated above, Ib and Ib45 lag I by 180° and 225°, respectively.

The first and second delay lines 132 and 133, respectively, of the fourth differential delay line 130d output the Qb and Qb45 clock phases, respectively. The delay elements 134 of the delay lines 132 and 133 of the fourth set 130d are controlled by Vctrl_I and Vctrl_I45, respectively, to ensure that the Qb and Qb45 clock phases output from the delay lines 132 and 133, respectively, are at a 45° phase difference from one another once the DLL 130 settles. As indicated above, Qb and Qb45 lag I by 270° and 315°, respectively.

The control signals Vctrl_I and Vctrl_I45 are received by control circuits 136 of the differential delay lines sets 130a-130d and used to control the delays provided by the delay elements 134. A variety of control circuits can be used for this purpose, as will be understood by persons of skill in the art. Examples of suitable control circuits for this purpose are disclosed in U.S. Pat. No. 10,447,280, which is assigned to the assignee of the present application and which is incorporated by reference herein.

Figure 4:
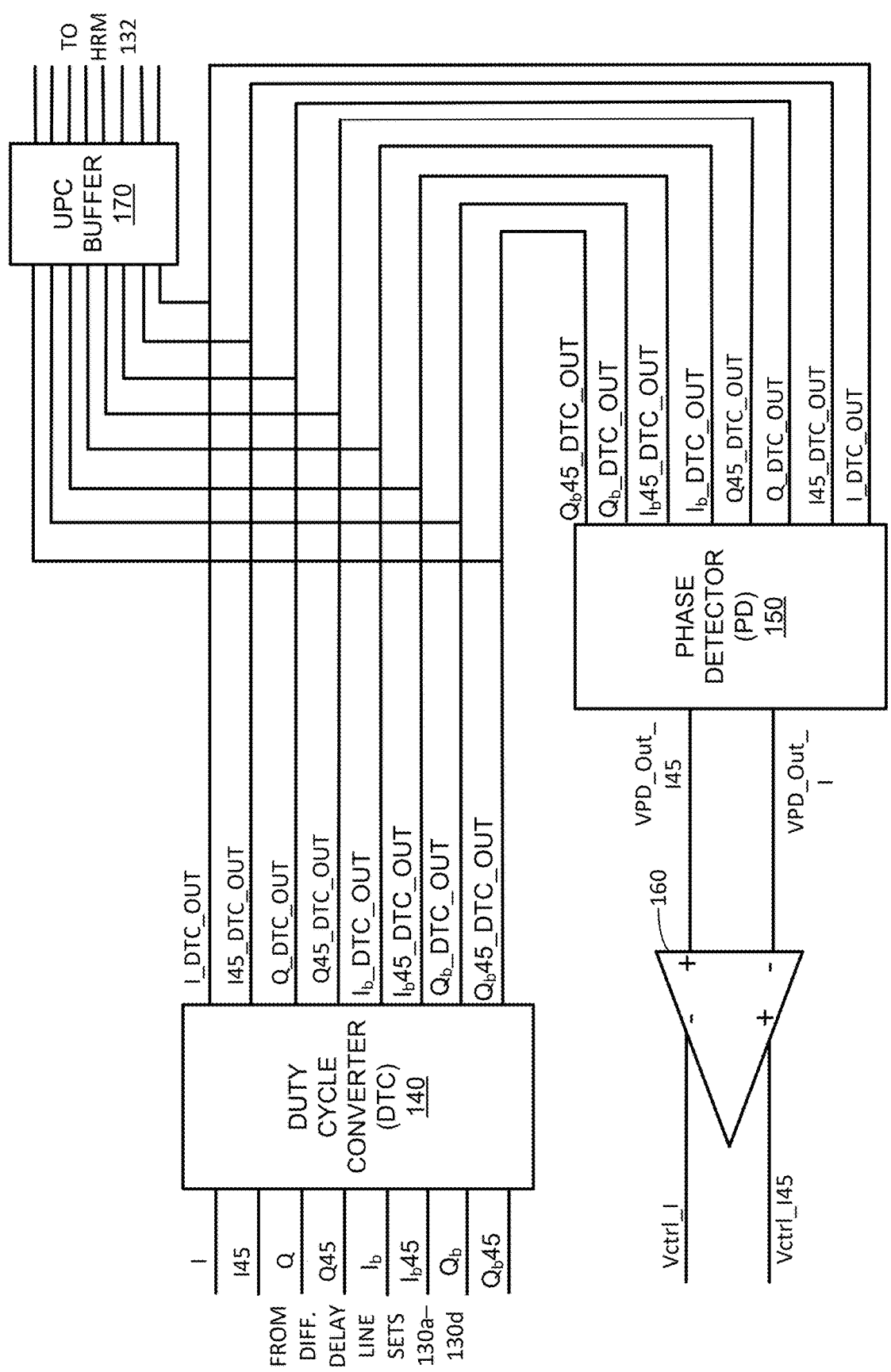
FIG. 4 illustrates a block diagram of a duty cycle converter (DTC), a PD and an operational amplifier (Op Amp) of the DLL shown in FIG. 1, in accordance with an exemplary embodiment, which can work in combination with the differential delay line sets shown in FIG. 3.

FIG. 4 illustrates a block diagram of the DTC 140, the PD 150 and an operational amplifier (Op Amp) 160 that work in combination with the differential delay line sets 130a-130d shown in FIG. 3 to complete the closed feedback loop of the DLL 130. The DTC 140 receives the I, I45, Q, Q45, Ib, Ib45, Qb and Qb45 clock phase offset signals that are output on the delay lines 132 and 133 shown in FIG. 2 with the 50% duty cycle, converts them into I, I45, Q, Q45, Ib, Ib45, Qb and Qb45 clock phase offset signals having a new duty cycle and outputs the I, I45, Q, Q45, Ib, Ib45, Qb and Qb45 clock phase offset signals having the new duty cycle to PD 150. In accordance with exemplary embodiments described herein, the new duty cycle is 12.5%, as will be described below in more detail with reference to FIG. 5.

The PD 150 receives the I, I45, Q, Q45, Ib, Ib45, Qb and Qb45 clock phase offset signals having the 12.5% duty cycle and processes them in one or more manners described below with reference to FIGS. 5-7 to two output voltage signals Vpd_I and Vpd_I45 representative of the phase difference between the I and I45 clock phase offset signals. This phase difference voltage is applied as a differential voltage to the input terminals of Op Amp 160, which converts the phase difference voltage into the control signals shown in FIG. 3, Vctrl_I and Vctrl_I45, and outputs the control signals to the control circuits 136 shown in FIG. 3. The control circuits 136 then adjust the delays provided by the delay elements 134 as needed until the DLL 130 locks to the precise 45° differences needed for the clock phase offset signals I, I45, Q, Q45, Ib, Ib45, Qb and Qb45. The values of these clock phase offset signals I, I45, Q, Q45, Ib, Ib45, Qb and Qb45 having the 12.5% duty cycle are input to a UPC buffer 170 that holds these values until they are output to the HRM 132 where they are used to perform the above-described mixing operations.

Figure 5:
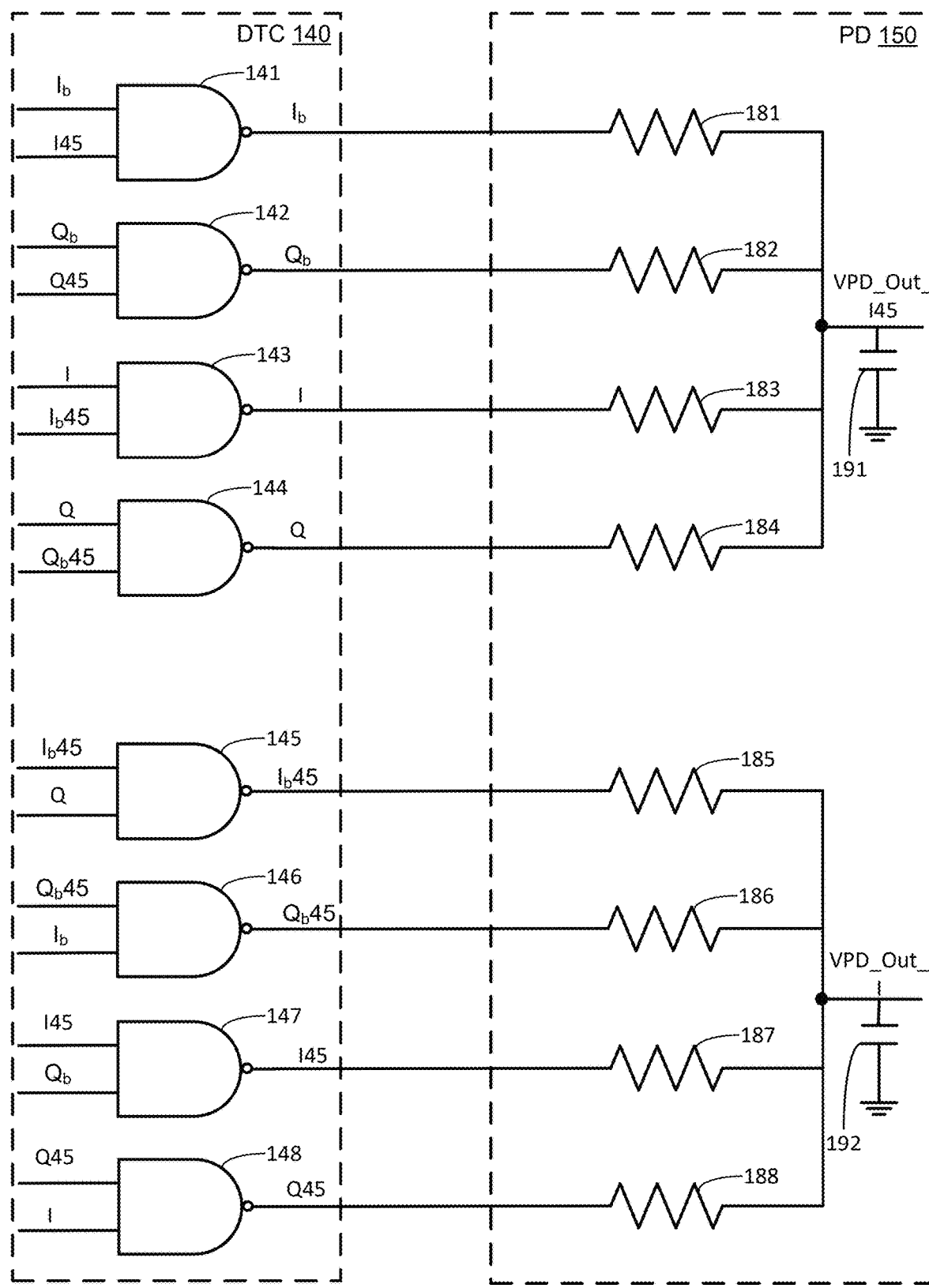
FIG. 5 illustrates a schematic block diagram of the DTC and the PD of the DLL shown in FIGS. 3 and 4 in accordance with an exemplary embodiment.

FIG. 5 illustrates a schematic block diagram of the DTC 140 and the PD 150 of the DLL shown in FIGS. 3 and 4. As indicated above, in accordance with an exemplary embodiment, the PD 150 uses no logic gates, which reduces power consumption while also further loosening design and manufacturing constraints. In addition, the DTC 140 and the PD 150 are capable of achieving a duty cycle of 12.5% and a wide angular operating range of about −135° and 225°.

In many current DLL designs, the DTC and the PD typically have logic gates. In such cases, very tight design and manufacturing constraints are needed to ensure proper slew rate control between the gates of the DTC and of the gates of the PD. By removing logic gates from the PD of the present disclosure, design and manufacturing constraints for the DLL are further relaxed. Also, when there are logic gates in the PD in current DLL designs, the gates in the DTC must drive the gates of the PD, which results in more current consumption. Therefore, removing logic gates from the PD 150 of the present disclosure reduces power consumption while also loosening design and manufacturing constraints.

In accordance with the exemplary embodiment shown in FIG. 5, the PD 150 comprises first and second sets of resistors 181-184 and 185-188, respectively, that are connected to the outputs of NAND gates 141-144 and 145-148, respectively. The NAND gates 141-148 receive at their inputs the 50% clock phase offset signals that are output from the delay lines 132 and 133 shown in FIG. 3. Each of the clock phase offset signals is used twice by the configuration of DTC logic gates 141-148 shown in FIG. 5.

In accordance with this exemplary embodiment, each of the NAND gates 141-148 converts the respective input voltage signals having 50% duty cycles into a respective output voltage signal having a 12.5% duty cycle. The gates 141-148 depicted actually produce a duty cycle of 87.5%, but this is deemed to be equivalent to a duty cycle of 12.5% because a 12.5% duty cycle can be obtained by simply inverting the 87.5% waveform. These output voltage signals are applied across a respective one of the resistors 181-188, resulting in the resistors 181-184 summing the 45° phases to produce PD output signal VPD_Out_I45 at an output terminal having a capacitor 191 connected between the respective resistor 181-184 and ground. Likewise, the resistors 185-188 sum the quadrature phases to produce PD output signal VPD_Out_I at an output terminal of the DTC 140 having a capacitor 192 connected between the respective resistor 185-188 and ground. These output signals of the PD 150 are then input to the input terminals of the Op Amp 160 shown in FIG. 4, which produces the feedback control signals Vctrl_I and Vctrl_I45 that are used by the control circuits 136 shown in FIG. 3 to control the delays of the delay elements 134. The resistors 181-188 may be, for example, 16 kΩ resistors. A typical value for the capacitors 191 and 192 can be 800 femtofarad (fF).

Figure 6:
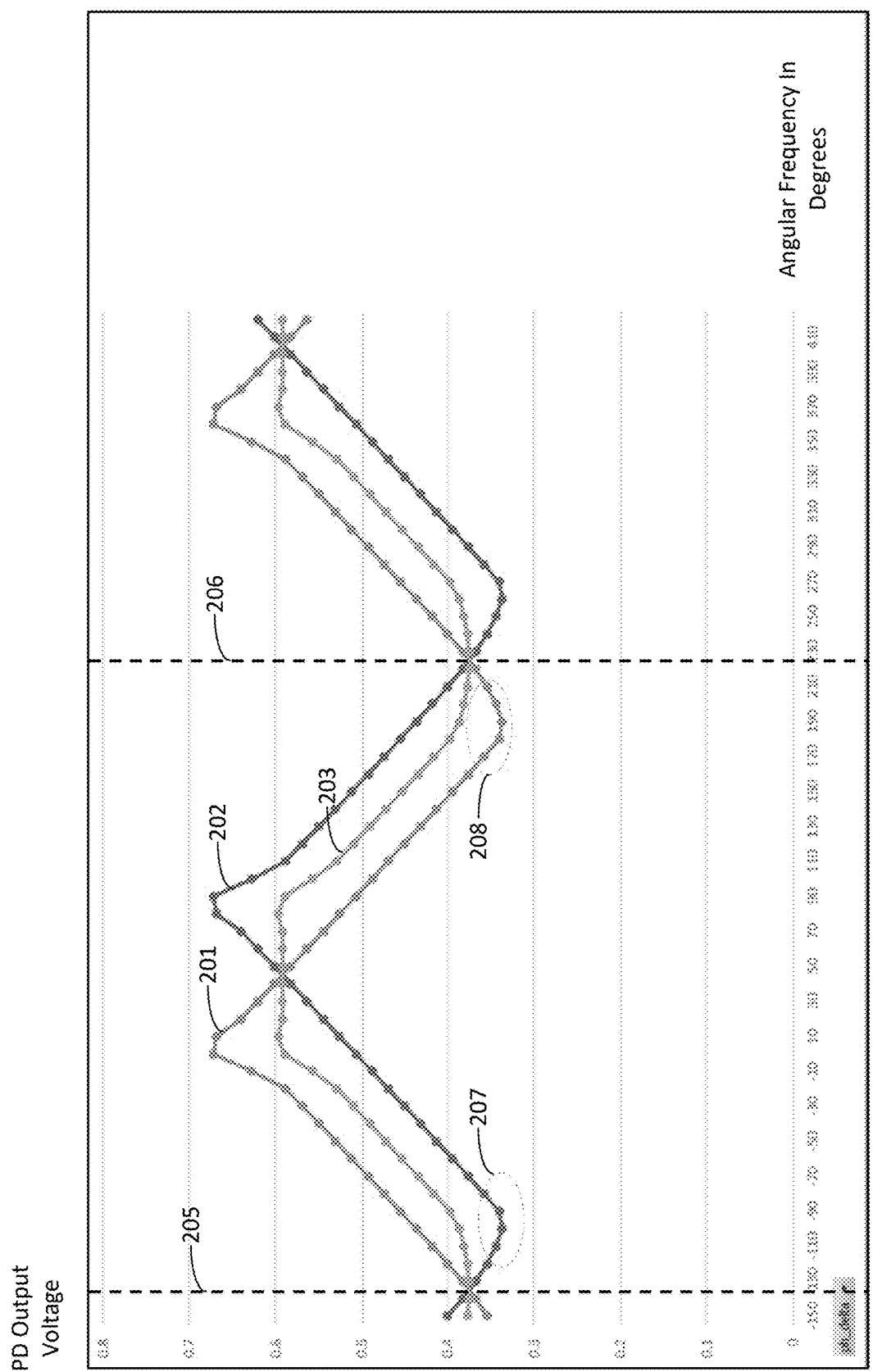
FIG. 6 is a graph showing the output characteristics of the PD shown in FIG. 5.

FIG. 6 is a graph showing the output characteristics of the PD 150 shown in FIG. 5. The abscissa, or X-axis, represents angular frequency and the ordinate, or Y-axis, represents voltage. Curve 201 represents VPD_OUT_I over an angular range, curve 202 represents VPD_OUT_I45 over the same angular range and curve 203 represents the common mode voltage over the same angular range, i.e., the average of curves 201 and 202. The vertical dashed lines 205 and 206 cross all three curves at the metastable points of operation of the PD 150, meaning that the PD 150 is stable when operating over the range of frequencies in between these points. This angular range of stable operations corresponds to angles ranging from −135° to 225°, with a duty cycle of 12.5%. While the PD 150 is not limited to these characteristics, they represent a very suitable operating range and duty cycle. The unflattened shape of the curves 201 and 202 at points 207 and 208 indicate that the PD 150 also exhibits a relatively high loop gain, which leads to a shorter settling time for the DLL. On some existing PDs, these areas on these curves are flattened out, indicating a lower loop gain for the PD, and thus a slower settling time for the PD.

Figure 7:
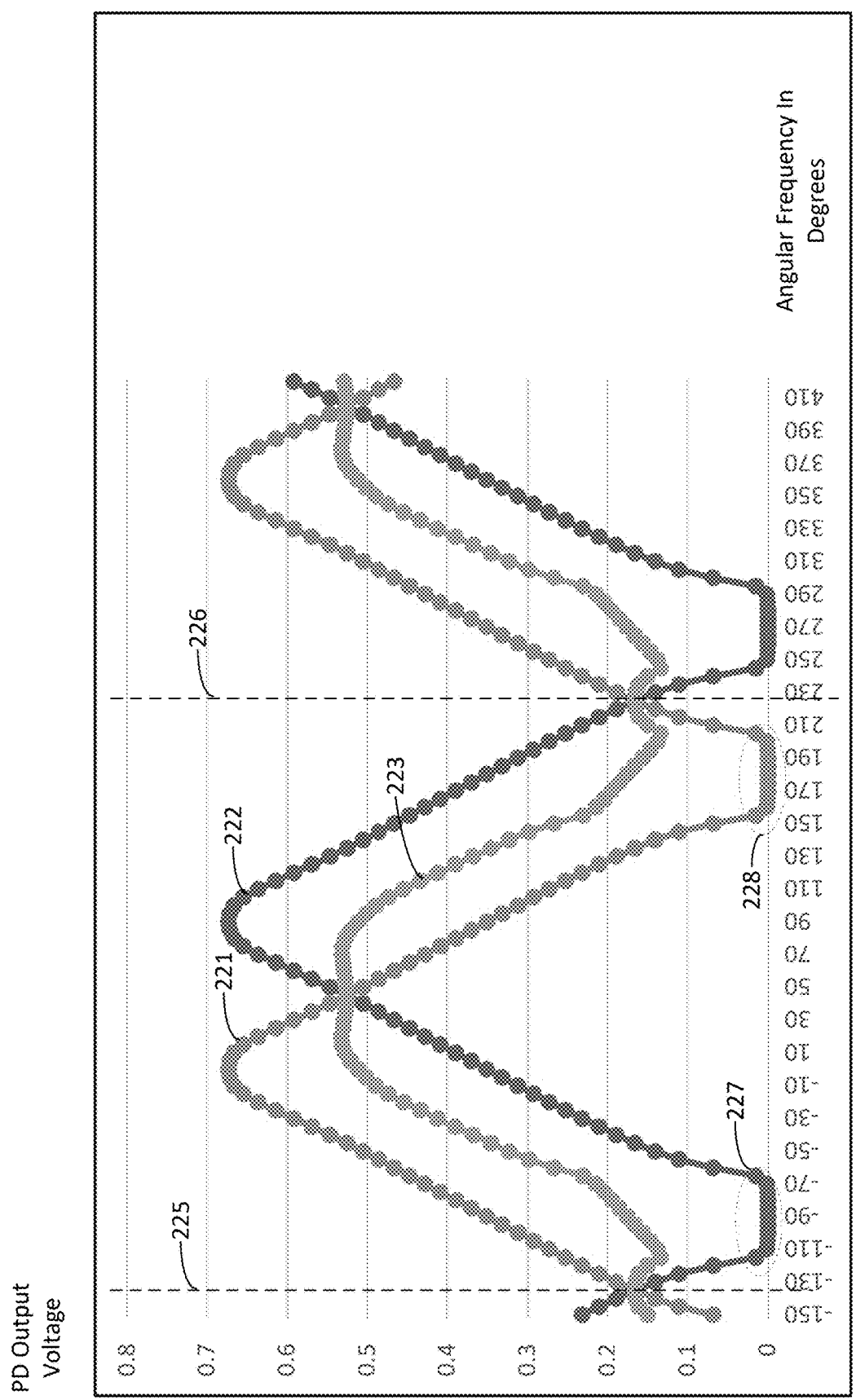
FIG. 7 is a graph showing the output characteristics of a known PD that has the same operating range as the PD shown in FIG. 5, but has a higher duty cycle and a lower loop gain than the PD shown in FIG. 5.

For example, FIG. 7 is a graph showing the output characteristics of a known PD that has the same operating range as PD 150, but a higher duty cycle and a lower loop gain than PD 150. In FIG. 7, curve 221 represents VPD_OUT_I45 over an angular range, curve 222 represents VPD_OUT_I over the same angular range and curve 223 represents the common mode voltage over the same angular range, i.e., the average of curves 221 and 222. The vertical dashed lines 225 and 226 cross all three curves at the metastable points of operation of the known PD. This angular range of stable operations corresponds to −135° to 225°, with a duty cycle of 25%. The flattened shape of the curves 221 and 222 at points 227 and 228 indicate that the known PD exhibits a lower loop gain than that exhibited by PD 150 of the present disclosure, which leads to a slower settling time for the DLL. Thus, the PD 150 of the present disclosure is capable of achieving the same angular range, but with a lower duty cycle of 12.5% and with higher loop gain, leading to a shorter DLL setting time.

Figure 8:
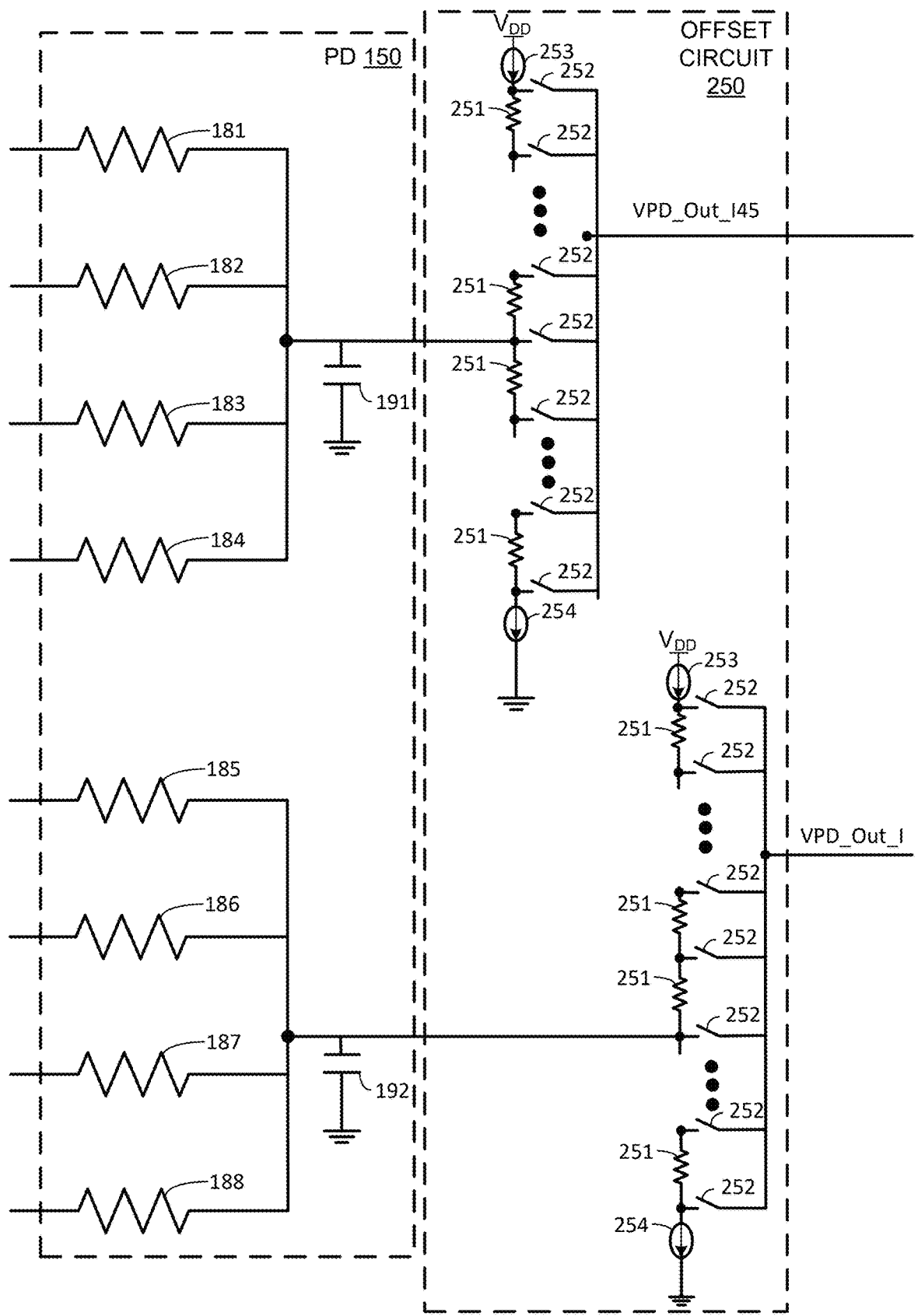
FIG. 8 is a schematic block diagram of the PD shown in FIG. 5 connected to a programmable voltage offset circuit in accordance with an exemplary embodiment.

FIG. 8 is a schematic block diagram of the PD 150 shown in FIG. 5 connected to a programmable voltage offset circuit 250. The voltage offset circuit 250 can be programmed to vary the output voltages VPD_OUT_I45 and VPD_OUT_I to compensate for post-layout mismatches in silicon that in the past have affected the ability of DLLs to settle precisely to the desired phases. This, in turn, loosens design and manufacturing constraints that are currently employed to ensure that DLLs settle precisely to the desired phases.

The offset circuit 250 comprises first and second sets of resistors 251 and first and second sets of switches 252. The switches 252 can be turned on and off using control bits to change the number of resistors 251 that are affecting the PD output voltages VPD_OUT_I and VPD_OUT_I45. The control bits are typically determined by observing performance, such as 3lomBB, 4FMODP, 4FMODS parameters post layout or post silicon to determine offset block settings. Current sources 253 and 254 connected to a supply voltage $V_{DD}$ and to ground, respectively, provide current flow through the voltage offset circuit 250. The switches 252 can be N-type metal oxide semiconductor (NMOS) transistors that are turned on and off by applying a control bit that is a one or a zero, respectively, to their gates, although PMOS transistors can also be used for this purpose.

For example, an N-bit control word can be applied to the switches 252 to turn them off or on in order to make small adjustments to the PD output voltages VPD_OUT_I and VPD_OUT_I45, which results in small adjustments being made to the control voltages Vctrl_I and Vctrl_I45 that are output by the Op Amp 160 (FIG. 4) to the control circuits 136 (FIG. 3). N can be any positive integer that is greater than or equal to one. The control bits are generated by an offset control circuit (not shown), which can be a component of the voltage offset circuit 250 or of some other circuit of the RF transceiver 120, such as the phase generator 128 or the DLL 130. The PD 150 decides the default voltage and the resistor 251 to activate and current adds or reduces the voltage at the output of the PD 150 depending on which switch 252 is turned on.

In the default state of the voltage offset circuit 250, the switches 252 that are connected to the two output terminals of the PD 150 are turned on and all of the other switches 252 are turned off. This results in the PD 150 operating the same as it does without the offset circuit 250. In accordance with an exemplary embodiment, as each additional switch 252 is turned on, the corresponding PD output voltage is increased in steps of 0.5 millivolts (mV) resulting in about a 0.25 degree change in the delay achieved by the delay line 132 or 133 to which the control signal Vctrl_I or Vctrl_I45 is applied. The total voltage range of the offset circuit 250 can be, for example, ±4.0 mV. The step size can be, for example, 0.5 mV and is equal to resistance (resistors 251)*current (current source 253). Range also depends on step size*total number of resistors 251. For example, if 0.5 mV step size*16 resistors in each path (resistors 251 of 253), the total voltage range is +/−8 mV.

The voltage range can be increased by increasing the number of resistors 251, switches 252 and control bits that are used to control the switches 252, with the only limitation being the possibility of going out of range of the Op Amp 160. Because the maximum range preferably is around 8 to 10 mV, this will not cause Op amp 160 to go out of range at all, and therefore there is no limitation as such.

This programmability and fine-tuning feature of the PD 150 increases flexibility by allowing the phase differences provided by the DLL 130 to be adjusted in a very precise way in small increments to compensate for systematic mismatches. This feature also improves HRM parameters such as 4FMODP, 4FMODS, 3LOmBB.

Figure 9:
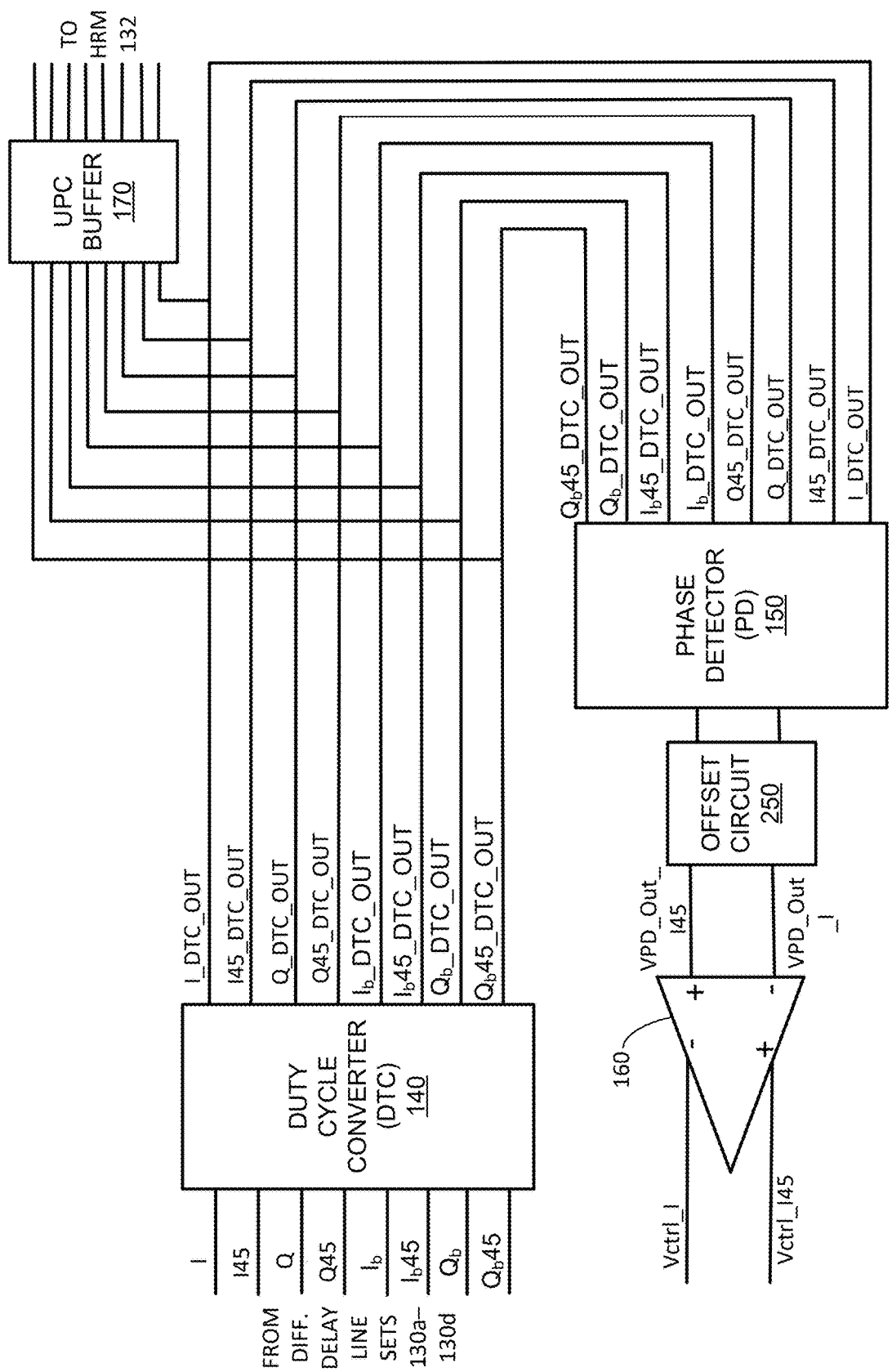
FIG. 9 illustrates a block diagram of the DTC, the PD and the Op Amp shown in FIG. 4 with the offset circuit shown in FIG. 8 disposed in between the output of the PD and the input of the Op Amp in accordance with an exemplary embodiment.
Figure 10:
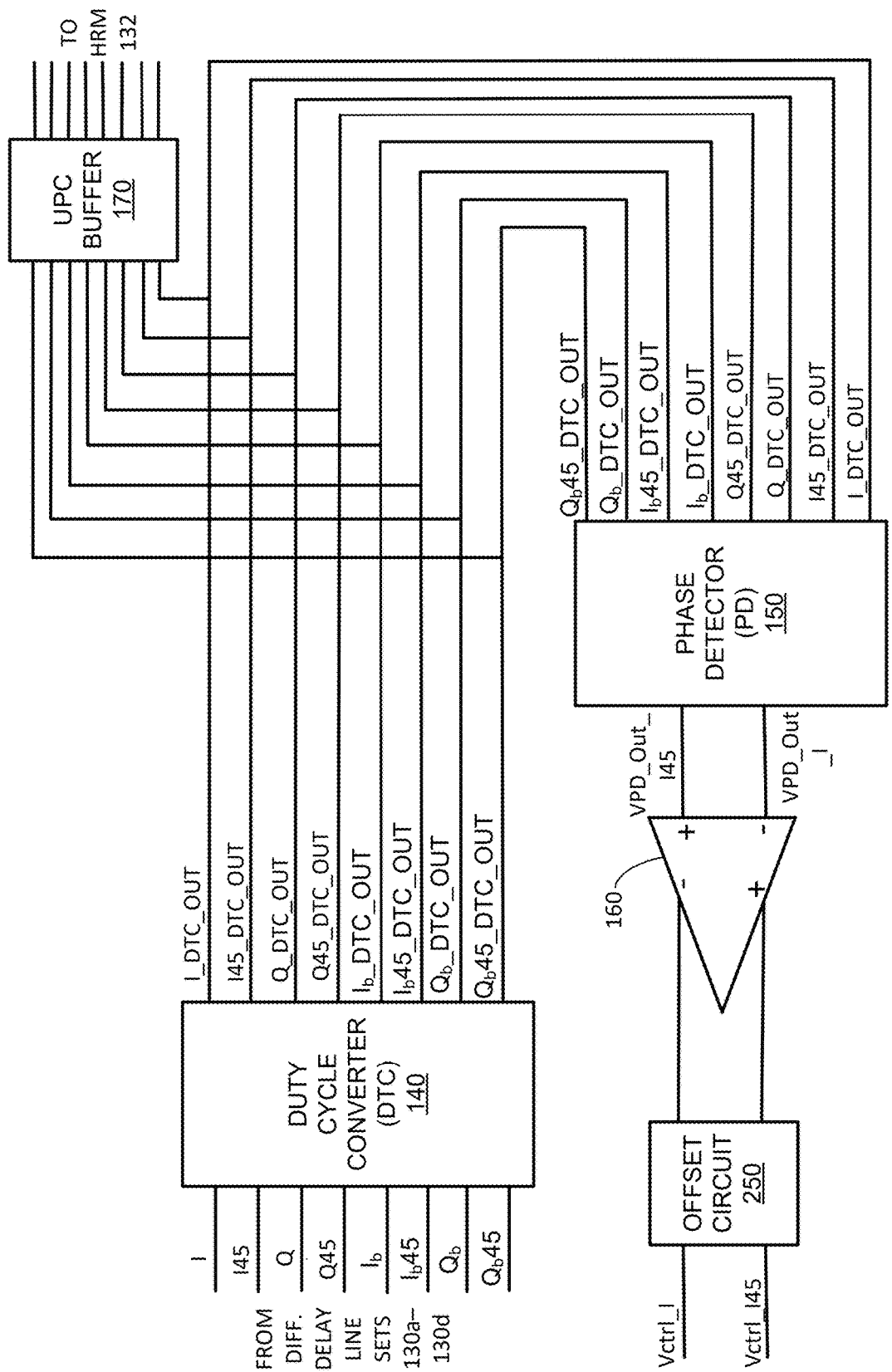
FIG. 10 illustrates a block diagram of the DTC, the PD and the Op Amp shown in FIG. 4 in accordance with an exemplary embodiment with the offset circuit disposed in between the output of the Op Amp and the inputs of the control circuits of the differential delay lines shown in FIG. 3.

The voltage offset circuit 250 can be placed at different locations in the DLL 130. FIG. 9 illustrates a block diagram of the DTC 140, the PD 150 and Op Amp 160 shown in FIG. 4 with the offset circuit 250 disposed in between the output of the PD 150 and the input of the Op Amp 160. In this case, the offset circuit 250 works in the manner described above with reference to FIG. 8 to generate VPD_OUT_I45 and VPD_OUT_I, which are then received by the Op Amp 160 as inputs. FIG. 10 illustrates a block diagram of the DTC 140, the PD 150 and Op Amp 160 shown in FIG. 4 with the offset circuit 250 disposed in between the output of the Op Amp 160 and the inputs of the control circuits 136 (FIG. 3). In this case, the offset circuit 250 receives the differential voltage signal output from the Op Amp 160 and converts it into voltage output signals Vctrl_I and Vctrl_I45.

Figure 11:
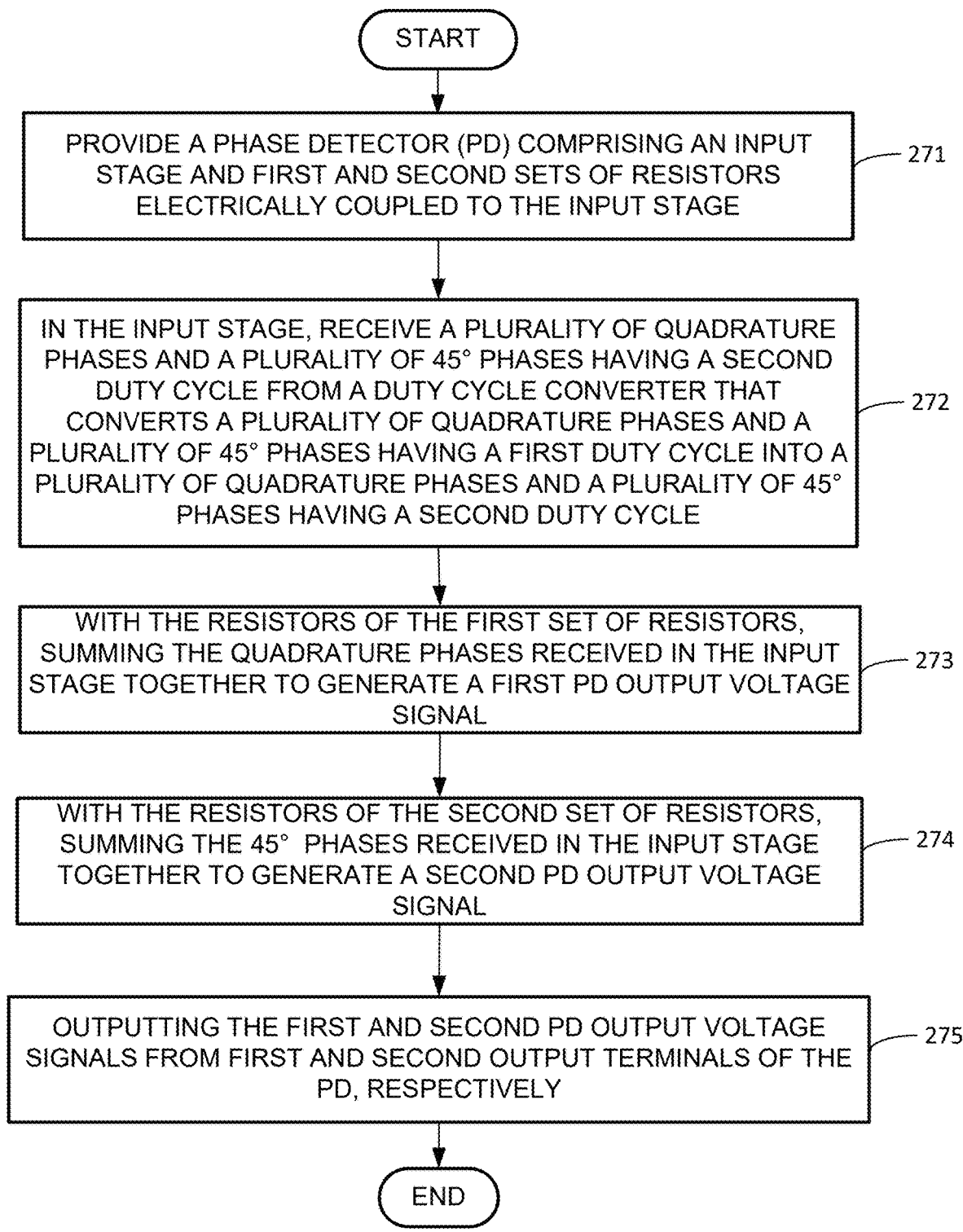
FIG. 11 illustrates a flow diagram of the method in accordance with an exemplary embodiment of the present disclosure.

FIG. 11 illustrates a flow diagram of the method in accordance with an exemplary embodiment of the present disclosure. Block 271 represents the step of providing a PD comprising an input stage and at least first and second sets of resistors electrically coupled to the input stage. Block 272 represents the step of receiving, in the input stage, a plurality of quadrature phases and a plurality of 45° phases having a second duty cycle from a duty cycle converter (DTC) that converts quadrature and 45° phases having a first duty cycle into the quadrature and 45° phases having the second duty cycle. Block 273 represents the step of, with the resistors of the first set of resistors, summing the quadrature phases received in the input stage together to generate a first PD output voltage signal. Block 274 represents the step of, with the resistors of the second set of resistors, summing the 45° phases received at the input stage together to generate a second PD output voltage signal. Block 275 represents the step of outputting the first and second PD output voltage signals from first and second output terminals of the PD, respectively.

Implementation examples are described in the following numbered clauses:

1. An apparatus comprising:
a phase detector (PD) comprising:
an input stage configured to receive a plurality of quadrature phases and a plurality of 45° phases having a second duty cycle from a duty cycle converter (DTC) of the DLL that converts quadrature and 45° phases having a first duty cycle into the quadrature and 45° phases having the second duty cycle; and
at least first and second sets of resistors electrically coupled to the input stage for receiving the quadrature and 45° phases having the second duty cycle, respectively, wherein the resistors of the first set of resistors sum the quadrature phases received in the input stage together to generate a first PD output voltage signal and wherein the resistors of the second set of resistors sum the 45° phases received at the input stage together to generate a second PD output voltage signal, the first and second PD output voltage signals being output from first and second output terminals of the PD, respectively.

2. The apparatus of clause 1, wherein the second duty cycle is 12.5%.

3. The apparatus of any of clauses 1-2, wherein the PD has an operating range that includes angular frequencies ranging from −135° to 225°.

4. The apparatus of any of clauses 1-3, wherein said plurality of quadrature phases comprises I, Q, Ib and Qb quadrature phases and wherein said plurality of 45° phases comprises I45, Q45, Ib45 and Qb45 phases, wherein the I45 phase lags the I phase by 45°, the Q phase lags the I phase by 90°, the Q45 phase lags the I phase by 135°, the Ib phase lags the I phase by 180°, the Ib45 lags the I phase by 225°, the Qb phase lags the I phase by 270°, and the Qb45 phase lags the I phase by 315°.

5. The apparatus of any of clauses 1-4, further comprising a programmable voltage offset circuit having a programmed configuration that is configured to receive the first and second PD output voltage signals output from the PD and to adjust at least one of the first and second PD output voltages based on the programmed configuration to produce at least one of an adjusted first PD output voltage signal and an adjusted second PD output voltage signal.

6. The apparatus of clause 5, wherein the programmable voltage offset circuit comprises:
a first set of offset circuit resistors disposed in between the first output terminal of the PD and a first output terminal of the voltage offset circuit;
a second set of offset circuit resistors disposed in between the second output terminal of the PD and a second output terminal of the voltage offset circuit;
a first set of switches, each switch of the first set of switches being disposed in between one of the resistors of the first set of offset circuit resistors and the first output terminal of the voltage offset circuit;
a second set of switches, each switch of the second set of switches being disposed in between one of the resistors of the second set of offset circuit resistors and the second output terminal of the voltage offset circuit; and
an offset control circuit configured to control assertion and deassertion of the control bits to turn the switches on and off, respectively, in a predetermined manner, wherein turning the switches of the first and second sets of switches on or off in a predetermined manner adjusts the first and second PD output voltages, respectively, in a predetermined manner to produce adjusted first and second PD output voltage signals.

7. The apparatus of any of clauses 1-6, wherein the PD is part of a delay-locked loop (DLL) that further comprises:
a plurality of differential delay lines, each differential delay line being configured to input a first clock signal and to output one of the quadrature phases and one of the 45° phases having the first duty cycle, the differential delay lines comprising control circuits configured to control delays of delay elements of the differential delay lines;
a duty cycle converter (DTC) configured to input the quadrature and 45° phases output from the differential delay lines, to convert the quadrature and 45° phases input to the DTC into quadrature and 45° phases having the second duty cycle and to output the quadrature and 45° phases having the second duty cycle to the PD; and
an operational amplifier configured to input and process the first and second PD output voltage signals output from the PD to produce first and second control signals that are delivered to the control circuits of the differential delay lines and used by the control circuits of the differential delay lines to control the delays of the delay elements.

8. The apparatus of clause 7, wherein the second duty cycle is 12.5%.

9. The apparatus of any of clauses 7-8, wherein the PD has an operating range that includes angular frequencies ranging from −135° to 225°.

10. The apparatus of any of clauses 7-9, wherein said plurality of quadrature phases comprises I, Q, Ib and Qb quadrature phases and wherein said plurality of 45° phases comprises I45, Q45, Ib45 and Qb45 phases, wherein the I45 phase lags the I phase by 45°, the Q phase lags the I phase by 90°, the Q45 phase lags the I phase by 135°, the Ib phase lags the I phase by 180°, the Ib45 lags the I phase by 225°, the Qb phase lags the I phase by 270°, and the Qb45 phase lags the I phase by 315°.

11. A radio frequency (RF) transceiver comprising:
a delay-locked loop (DLL) comprising:
a plurality of differential delay lines, each differential delay line being configured to input a first clock signal and to output a quadrature phase and a 45° phase, the quadrature and 45° phases having a first duty cycle, the differential delay lines comprising control circuits configured to control delays of delay elements of the differential delay lines;
a duty cycle converter (DTC) configured to input the quadrature and 45° phases having the first duty cycle and to output quadrature and 45° phases having a second duty cycle; and a phase detector (PD) comprising:
an input stage configured to receive the quadrature and 45° phases having the second duty cycle that are output from the DTC; and
at least first and second sets of resistors electrically coupled to the input stage for receiving the quadrature phases and the 45° phases having the second duty cycle, respectively, from the input stage, wherein the resistors of the first set of resistors sum the quadrature phases received in the input stage together to generate a first PD output voltage signal and wherein the resistors of the second set of resistors sum the 45° phases received at the input stage together to generate a second PD output voltage signal, the first and second PD output voltage signals being output from first and second output terminals of the PD, respectively.

12. The RF transceiver of clause 11, wherein the DLL further comprises:
an operational amplifier configured to process the first and second PD output voltage signals to produce first and second control signals that are delivered to the control circuits of the differential delay lines and used by the control circuits to control the delays of the delay elements.

13. The RF transceiver of any of clauses 11-12, further comprising:
a harmonic rejection mixer (HRM) that mixes a baseband signal with the quadrature and 45° phases having the second duty cycle that are output from the DTC to generate an HRM output signal.

14. The RF transceiver of any of clauses 11-13, wherein the second duty cycle is 12.5%.

15. The RF transceiver of any of clauses 11-14, wherein the PD has an operating range that includes angular frequencies ranging from −135° to 225°.

16. The RF transceiver of any of clauses 11-15, wherein said plurality of quadrature phases comprises I, Q, Ib and Qb quadrature phases and wherein said plurality of 45° phases comprises I45, Q45, Ib45 and Qb45 phases, wherein the I45 phase lags the I phase by 45°, the Q phase lags the I phase by 90°, the Q45 phase lags the I phase by 135°, the Ib phase lags the I phase by 180°, the Ib45 lags the I phase by 225°, the Qb phase lags the I phase by 270°, and the Qb45 phase lags the I phase by 315°.

17. The RF transceiver of any of clauses 11 and 13-16, wherein the DLL further comprises:
a programmable voltage offset circuit having a programmed configuration that is configured to receive the first and second PD output voltage signals output from the PD and to adjust at least one of the first and second PD output voltages based on the programmed configuration to produce adjusted first and second PD output voltage signals.

18. The RF transceiver of clause 17, further comprising an operational amplifier (OP Amp), and wherein the programmable voltage offset circuit is disposed in between the PD and the Op Amp and comprises:
a first set of offset circuit resistors disposed in between the first output terminal of the PD and a first output terminal of the voltage offset circuit;
a second set of offset circuit resistors disposed in between the second output terminal of the PD and a second output terminal of the voltage offset circuit;
a first set of switches, each switch of the first set of switches being disposed in between one of the resistors of the first set of offset circuit resistors and the first output terminal of the voltage offset circuit;
a second set of switches, each switch of the second set of switches being disposed in between one of the resistors of the second set of offset circuit resistors and the second output terminal of the voltage offset circuit; and
an offset control circuit configured to control assertion and deassertion of control bits to turn the switches on and off, respectively, in a predetermined manner, wherein turning the switches of the first and second sets of switches on or off in a predetermined manner adjusts at least one of the first and second PD output voltages, respectively, and wherein the offset control circuit outputs the adjusted first and second PD output voltage signals to the Op Amp, and wherein the Op Amp is configured to process the adjusted first and second PD output voltage signals to produce first and second control signals that are delivered to the control circuits of the differential delay lines and used by the control circuits of the differential delay lines to control the delays of the delay elements.

19. The RF transceiver of clause 17, further comprising an operational amplifier (OP Amp), and wherein the programmable voltage offset circuit is disposed in between the Op Amp and the control circuits of the differential delay lines, the Op Amp being configured to process the first and second PD output voltage signals output from the PD to produce first and second control signals that are delivered to the voltage offset circuit, the voltage offset circuit comprises:
a first set of offset circuit resistors disposed in between the first output terminal of the PD and a first output terminal of the voltage offset circuit;
a second set of offset circuit resistors disposed in between the second output terminal of the PD and a second output terminal of the voltage offset circuit;
a first set of switches, each switch of the first set of switches being disposed in between one of the resistors of the first set of offset circuit resistors and the first output terminal of the voltage offset circuit;
a second set of switches, each switch of the second set of switches being disposed in between one of the resistors of the second set of offset circuit resistors and the second output terminal of the voltage offset circuit; and
an offset control circuit configured to control assertion and deassertion of control bits to turn the switches on and off, respectively, in a predetermined manner, wherein turning the switches of the first and second sets of switches on or off in a predetermined manner adjusts at least one of the first and second control signals, respectively, to produce adjusted first and second control signals, the offset control circuit outputting the adjusted first and second control signals to the control circuits of the differential delay lines for use by the control circuits of the differential delay lines to control the delays of the delay elements.

20. A method for performing phase detection comprising:
providing a phase detector (PD) comprising an input stage and at least first and second sets of resistors electrically coupled to the input stage;
in the input stage, receiving a plurality of quadrature phases and a plurality of 45° phases having a second duty cycle from a duty cycle converter (DTC) that converts quadrature and 45° phases having a first duty cycle into the quadrature and 45° phases having the second duty cycle;

with the resistors of the first set of resistors, summing the quadrature phases received in the input stage together to generate a first PD output voltage signal; and with the resistors of the second set of resistors, summing the 45° phases received at the input stage together to generate a second PD output voltage signal; and outputting the first and second PD output voltage signals from first and second output terminals of the PD, respectively.

Although selected aspects have been illustrated and described in detail, it will be understood that various substitutions and alterations may be made therein without departing from the spirit and scope of the present invention, as defined by the following claims.

What is claimed is:

1. An apparatus comprising:
a phase detector (PD) comprising:
an input stage configured to receive a plurality of quadrature phases and a plurality of 45° phases having a second duty cycle from a duty cycle converter (DTC) of a delay-locked loop (DLL) that converts a plurality of quadrature phases and a plurality of 45° phases having a first duty cycle into the plurality of quadrature phases and the plurality of 45° phases having the second duty cycle; and
at least first and second sets of resistors electrically coupled to the input stage for receiving the plurality of quadrature phases and the plurality of 45° phases having the second duty cycle, respectively, wherein the resistors of the first set of resistors sum the plurality of quadrature phases received in the input stage together to generate a first PD output voltage signal and wherein the resistors of the second set of resistors sum the plurality of 45° phases received at the input stage together to generate a second PD output voltage signal, the first and second PD output voltage signals being output from first and second output terminals of the PD, respectively.

2. The apparatus of claim 1, wherein the second duty cycle is 12.5%.

3. The apparatus of claim 2, wherein the PD has an operating range that includes angular frequencies ranging from −135° to 225°.

4. The apparatus of claim 3, wherein the plurality of quadrature phases having the second duty cycle comprises I, Q, Ib and Qb quadrature phases and wherein the plurality of 45° phases having the second duty cycle comprises I45, Q45, Ib45 and Qb45 phases, wherein the I45 phase lags the I phase by 45°, the Q phase lags the I phase by 90°, the Q45 phase lags the I phase by 135°, the Ib phase lags the I phase by 180°, the Ib45 lags the I phase by 225°, the Qb phase lags the I phase by 270°, and the Qb45 phase lags the I phase by 315°.

5. The apparatus of claim 1, further comprising a programmable voltage offset circuit having a programmed configuration that is configured to receive the first and second PD output voltage signals output from the PD and to adjust at least one of the first and at least one of the second PD output voltage signals based on the programmed configuration to produce at least one of an adjusted first PD output voltage signal and at least one of an adjusted second PD output voltage signal.

6. The apparatus of claim 5, wherein the programmable voltage offset circuit comprises:
a first set of offset circuit resistors disposed in between the first output terminal of the PD and a first output terminal of the voltage offset circuit;
a second set of offset circuit resistors disposed in between the second output terminal of the PD and a second output terminal of the voltage offset circuit;
a first set of switches, each switch of the first set of switches being disposed in between one of the resistors of the first set of offset circuit resistors and the first output terminal of the voltage offset circuit;
a second set of switches, each switch of the second set of switches being disposed in between one of the resistors of the second set of offset circuit resistors and the second output terminal of the voltage offset circuit; and
an offset control circuit configured to control assertion and deassertion of control bits to turn the first set of switches and the second set of switches on and off, respectively, in a predetermined manner, wherein turning the first set of switches and the second set of switches on or off in the predetermined manner adjusts the first and second PD output voltages, respectively, to produce the adjusted first and second PD output voltage signals.

7. The apparatus of claim 1, wherein the PD is part of the DLL that further comprises:
a plurality of differential delay lines, each differential delay line being configured to input a first clock signal and to output one of the quadrature phases and one of the 45° phases having the first duty cycle, the differential delay lines comprising control circuits configured to control delays of delay elements of the differential delay lines;
the DTC configured to input the quadrature and 45° phases output from the differential delay lines, to convert the plurality of quadrature and the plurality of 45° phases input to the DTC into quadrature and 45° phases having the second duty cycle and to output the quadrature and 45° phases having the second duty cycle to the PD; and
an operational amplifier configured to input and process the first and second PD output voltage signals output from the PD to produce first and second control signals that are delivered to the control circuits of the differential delay lines and used by the control circuits of the differential delay lines to control the delays of the delay elements.

8. The apparatus of claim 7, wherein the second duty cycle is 12.5%.

9. The apparatus of claim 8, wherein the PD has an operating range that includes angular frequencies ranging from −135° to 225°.

10. The apparatus of claim 9, wherein the plurality of quadrature phases having the second duty cycle comprises I, Q, Ib and Qb quadrature phases and wherein the plurality of 45° phases having the second duty cycle comprises I45, Q45, Ib45 and Qb45 phases, wherein the I45 phase lags the I phase by 45°, the Q phase lags the I phase by 90°, the Q45 phase lags the I phase by 135°, the Ib phase lags the I phase by 180°, the Ib45 lags the I phase by 225°, the Qb phase lags the I phase by 270°, and the Qb45 phase lags the I phase by 315°.

11. A radio frequency (RF) transceiver comprising:
a delay-locked loop (DLL) comprising:
a plurality of differential delay lines, each differential delay line being configured to input a first clock signal and to output a quadrature phase and a 45° phase, the quadrature phase and 45° phase having a first duty cycle, the differential delay lines comprising control circuits configured to control delays of delay elements of the differential delay lines;

a duty cycle converter (DTC) configured to input the quadrature phase and 45° phase having the first duty cycle and to output quadrature phases and 45° phases having a second duty cycle; and a phase detector (PD) comprising:
an input stage configured to receive the quadrature phases and 45° phases having the second duty cycle that are output from the DTC; and
at least first and second sets of resistors electrically coupled to the input stage for receiving the quadrature phases and the 45° phases having the second duty cycle, respectively, from the input stage, wherein the resistors of the first set of resistors sum the quadrature phases received in the input stage together to generate a first PD output voltage signal and wherein the resistors of the second set of resistors sum the 45° phases received at the input stage together to generate a second PD output voltage signal, the first and second PD output voltage signals being output from first and second output terminals of the PD, respectively.

12. The RF transceiver of claim 11, wherein the DLL further comprises:
an operational amplifier configured to process the first and second PD output voltage signals to produce first and second control signals that are delivered to the control circuits of the differential delay lines and used by the control circuits to control the delays of the delay elements.

13. The RF transceiver of claim 11, further comprising:
a harmonic rejection mixer (HRM) that mixes a baseband signal with the quadrature phases and 45° phases having the second duty cycle that are output from the DTC to generate an HRM output signal.

14. The RF transceiver of claim 13, wherein the second duty cycle is 12.5%.

15. The RF transceiver of claim 14, wherein the PD has an operating range that includes angular frequencies ranging from −135° to 225°.

16. The RF transceiver of claim 15, wherein the quadrature phases having the second duty cycle comprises I, Q, Ib and Qb quadrature phases and wherein the 45° phases having the second duty cycle comprises I45, Q45, Ib45 and Qb45 phases, wherein the I45 phase lags the I phase by 45°, the Q phase lags the I phase by 90°, the Q45 phase lags the I phase by 135°, the Ib phase lags the I phase by 180°, the Ib45 lags the I phase by 225°, the Qb phase lags the I phase by 270°, and the Qb45 phase lags the I phase by 315°.

17. The RF transceiver of claim 11, wherein the DLL further comprises:
a programmable voltage offset circuit having a programmed configuration that is configured to receive the first and second PD output voltage signals output from the PD and to adjust at least one of the first and at least one of the second PD output voltage signals based on the programmed configuration to produce adjusted first and second PD output voltage signals.

18. The RF transceiver of claim 17, further comprising an operational amplifier (OP Amp), and wherein the programmable voltage offset circuit is disposed in between the PD and the Op Amp and comprises:
a first set of offset circuit resistors disposed in between the first output terminal of the PD and a first output terminal of the voltage offset circuit;
a second set of offset circuit resistors disposed in between the second output terminal of the PD and a second output terminal of the voltage offset circuit;
a first set of switches, each switch of the first set of switches being disposed in between one of the resistors of the first set of offset circuit resistors and the first output terminal of the voltage offset circuit;
a second set of switches, each switch of the second set of switches being disposed in between one of the resistors of the second set of offset circuit resistors and the second output terminal of the voltage offset circuit; and
an offset control circuit configured to control assertion and deassertion of control bits to turn the first set of switches and the second set of switches on and off, respectively, in a predetermined manner, wherein turning the first set of switches and the second set of switches on or off in the predetermined manner adjusts at least one of the first and at least one of the second PD output voltages, respectively, and wherein the offset control circuit outputs the adjusted first and second PD output voltage signals to the Op Amp, and wherein the Op Amp is configured to process the adjusted first and the adjusted second PD output voltage signals to produce first and second control signals that are delivered to the control circuits of the differential delay lines and used by the control circuits of the differential delay lines to control the delays of the delay elements.

19. The RF transceiver of claim 17, further comprising an operational amplifier (OP Amp), and wherein the programmable voltage offset circuit is disposed in between the the Op Amp and the control circuits of the differential delay lines, the Op Amp being configured to process the first and second PD output voltage signals output from the PD to produce first and second control signals that are delivered to the voltage offset circuit, the voltage offset circuit comprises:
a first set of offset circuit resistors disposed in between the first output terminal of the PD and a first output terminal of the voltage offset circuit;
a second set of offset circuit resistors disposed in between the second output terminal of the PD and a second output terminal of the voltage offset circuit;
a first set of switches, each switch of the first set of switches being disposed in between one of the resistors of the first set of offset circuit resistors and the first output terminal of the voltage offset circuit;
a second set of switches, each switch of the second set of switches being disposed in between one of the resistors of the second set of offset circuit resistors and the second output terminal of the voltage offset circuit; and
an offset control circuit configured to control assertion and deassertion of control bits to turn the first set of switches and the second set of switches on and off, respectively, in a predetermined manner, wherein turning the first set of switches and the second set of switches on or off in the predetermined manner adjusts at least one of the first and at least one of the second control signals, respectively, to produce adjusted first and second control signals, the offset control circuit outputting the adjusted first and second control signals to the control circuits of the differential delay lines for use by the control circuits of the differential delay lines to control the delays of the delay elements.

20. A method for performing phase detection comprising:
providing a phase detector (PD) comprising an input stage and at least first and second sets of resistors electrically coupled to the input stage;
in the input stage, receiving a plurality of quadrature phases and a plurality of 45° phases having a second duty cycle from a duty cycle converter (DTC) that converts a plurality of quadrature phases and a plurality of 45° phases having a first duty cycle into the plurality of quadrature phases and the plurality of 45° phases having the second duty cycle;

with the resistors of the first set of resistors, summing the plurality of quadrature phases received in the input stage together to generate a first PD output voltage signal;

with the resistors of the second set of resistors, summing the plurality of 45° phases received at the input stage together to generate a second PD output voltage signal; and outputting the first and second PD output voltage signals from first and second output terminals of the PD, respectively.

* * * * *